United States Patent [19]
Dimick

[11] 4,085,959
[45] Apr. 25, 1978

[54] FIFTH WHEEL TRAILER HOME WITH FOLDING FORWARD SECTION

[76] Inventor: Royal H. Dimick, 1357 NW. Scenic Dr., Albany, Oreg. 97321

[21] Appl. No.: 726,823

[22] Filed: Sep. 27, 1976

[51] Int. Cl.² .............................................. B62D 53/04
[52] U.S. Cl. .................................. 296/23 MC; 296/26
[58] Field of Search ............ 296/23 MC, 23 C, 23 R, 296/26, 27, 23 D, 23 F; 52/67

[56] References Cited
U.S. PATENT DOCUMENTS

| | | | |
|---|---|---|---|
| 3,770,297 | 11/1973 | Quick | 296/23 C |
| 3,774,955 | 11/1973 | Byer | 296/23 C |
| 3,801,135 | 4/1974 | Winter | 296/23 MC |

*Primary Examiner*—Philip Goodman
*Attorney, Agent, or Firm*—Oliver D. Olson

[57] ABSTRACT

A travel trailer with a vertically foreshortened forward section, which is configured for extending over a towing vehicle for fifth wheel connection therewith, has folding side walls and front wall which open to extend the front section downward, providing full height throughout the trailer. The floor of the forward section is movable vertically between a raised position above the folded side walls and front wall for transportation of the trailer and a lowered position adjacent to the lower margins of the side walls and front wall when they are in their unfolded living positions. Winches and cables are arranged for separately raising and lowering the side walls, the front wall and the floor.

8 Claims, 9 Drawing Figures

FIFTH WHEEL TRAILER HOME WITH FOLDING FORWARD SECTION

BACKGROUND OF THE INVENTION

This invention relates to travel trailers and more particularly to a travel trailer arranged for fifth wheel towing connection having folding walls for expanding to full height the foreshortened forward section of the trailer.

In order to increase the length and weight of travel trailers of the type towed by light-weight pickup trucks, fifth wheel connections have been utilized, positioning the forward section of the trailer over the bed of the truck. As a result the forward section is foreshortened vertically, providing only limited usable living space.

To maximize this forward space the roofs of these trailers have been raised slightly in the area of the forward section, allowing for a climb-up bed to be located in this section. However, the lower forward portion of the trailer is still not usable, thereby requiring location of the living room area at the rear of the trailer, rather than at the front where it is most desired. Further, the raised height increases drag and instability of the trailer which are already critical in large travel trailers. Also, the stepped roof increases construction cost of the trailer.

Telescoping front sections have been devised for extending this foreshortened front section to full height. Such a device is shown in U.S. Pat. No. 3,770,297. However, telescoping walls are expensive to fabricate and of complex operation. Thus such trailers are initially expensive and are costly to maintain. In addition accommodation of the telescoping mechanism requires thick walls resulting in loss of inside floor space as well as adding to the weight of the trailer and lessening the rigidity of its front end. Curtains, pictures and similar articles also must be removed from the walls of a telescoping type trailer before it may be collapsed.

SUMMARY OF THE INVENTION

In its basic concept the travel trailer of this invention involves providing foldable side walls and front wall and a vertically movable floor for extending vertically the foreshortened front section of a travel trailer configured for fifth wheel connection.

It is by virtue of the foregoing basic concept that the principal objective of this invention is achieved; namely, to overcome the aforementioned limitations and disadvantages of prior art fifth wheel travel trailers.

Another important object of this invention is the provision of a travel trailer of the class described wherein the floor is supported by the side walls when in its expanded position, creating a stable platform.

Another important object of this invention is the provision of a travel trailer of the class described having actuation means which allow individual operation of the collapsing elements in a simple, positive, foolproof manner.

Another important object of this invention is the provision of a travel trailer of the class described which can be extended or collapsed quickly without the requirement of complex equipment.

Still another important object of this invention is the provision of a travel trailer of the class described which is of simplified construction for economical manufacture.

The foregoing and other objects and advantages of this invention will appear from the following detailed description taken in connection with the accompanying drawings of a preferred embodiment.

DESCRIPTION OF THE PREFERRED EMBODIMENT

Figure 1:
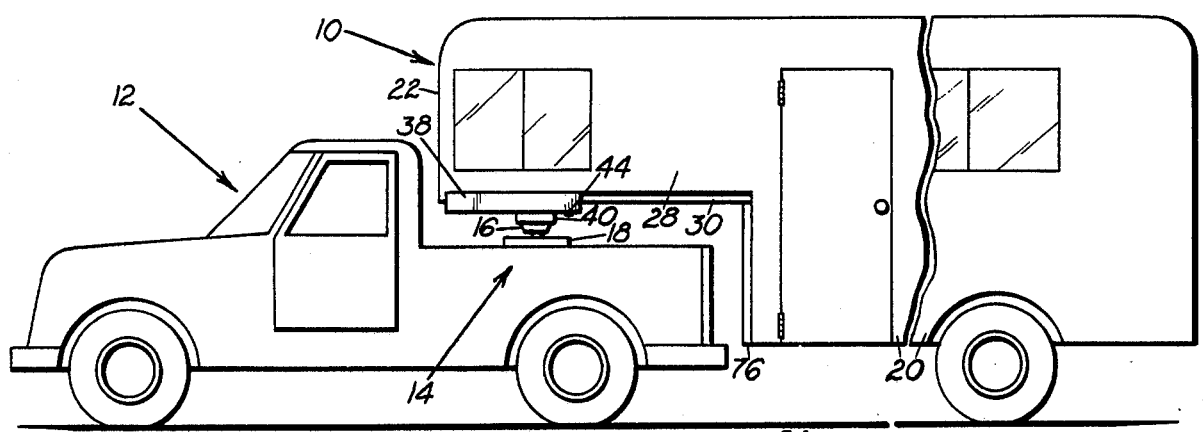
FIG. 1 is a foreshortened view, in side elevation, of a travel trailer embodying the features of this invention.

Referring to FIG. 1 of the drawings, a travel trailer 10 embodying the features of the present invention is shown connected to a towing vehicle, such as a pickup truck 12. The trailer is connected to the truck through a fifth wheel type hitch 14 having a male element 16 attached to the trailer and a female element 18 attached to a platform (not shown) which is mounted in the bed of the pickup.

The trailer is similar to prior art fifth wheel trailers in that its body has a full height rear section 20 and a vertically foreshortened forward section 22 which is configured for extending over the truck bed. However, unlike prior art fifth wheel trailers the roofline has a constant level making the height of the forward section of the trailer shorter than usual. When the trailer is in use, however, foldable side walls 24 and a front wall 26 extend the foreshortened forward section downward, providing full height throughout the trailer.

Figure 2:
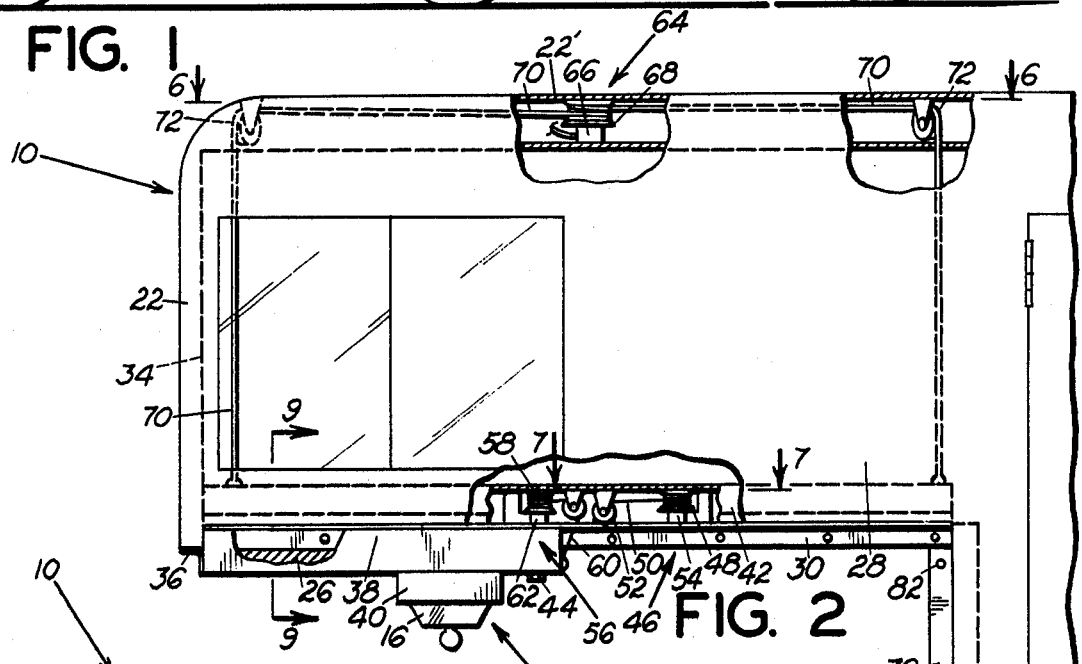
FIG. 2 is a fragmentary view, in side elevation, of the forward section of the trailer in its folded, travel configuration, partially broken away to disclose details of internal construction.
Figure 3:
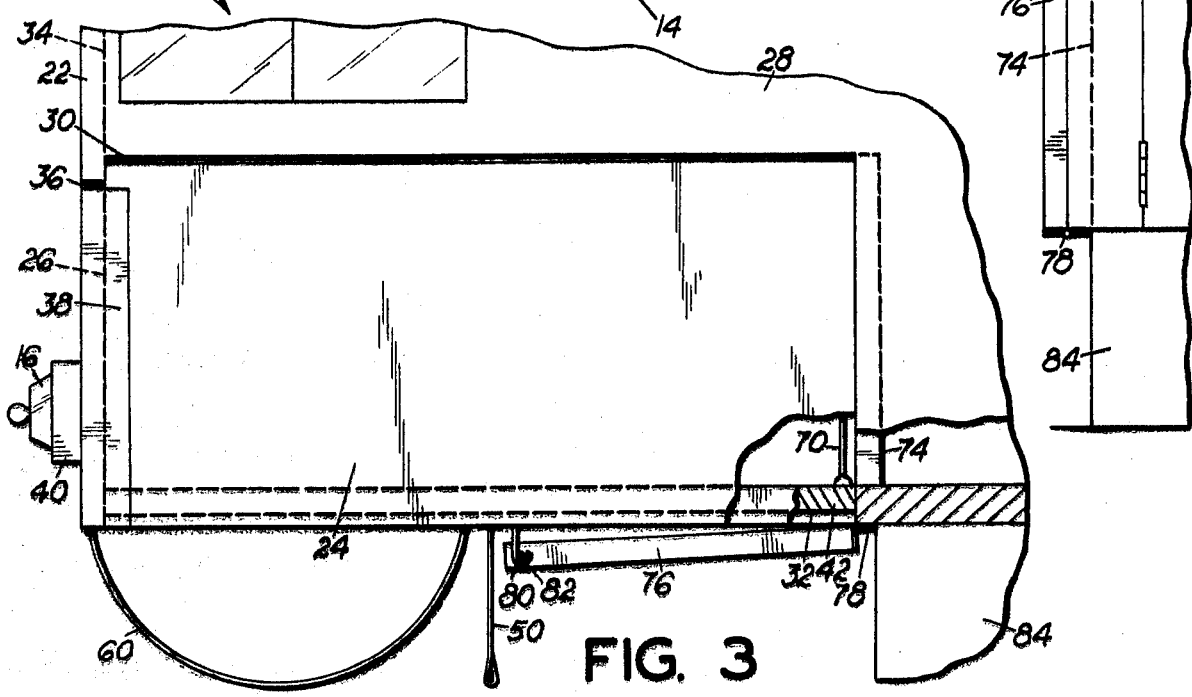
FIG. 3 is a fragmentary view, in side elevation, of the trailer in its unfolded, living configuration, partially broken away to disclose details of internal construction.
Figure 4:
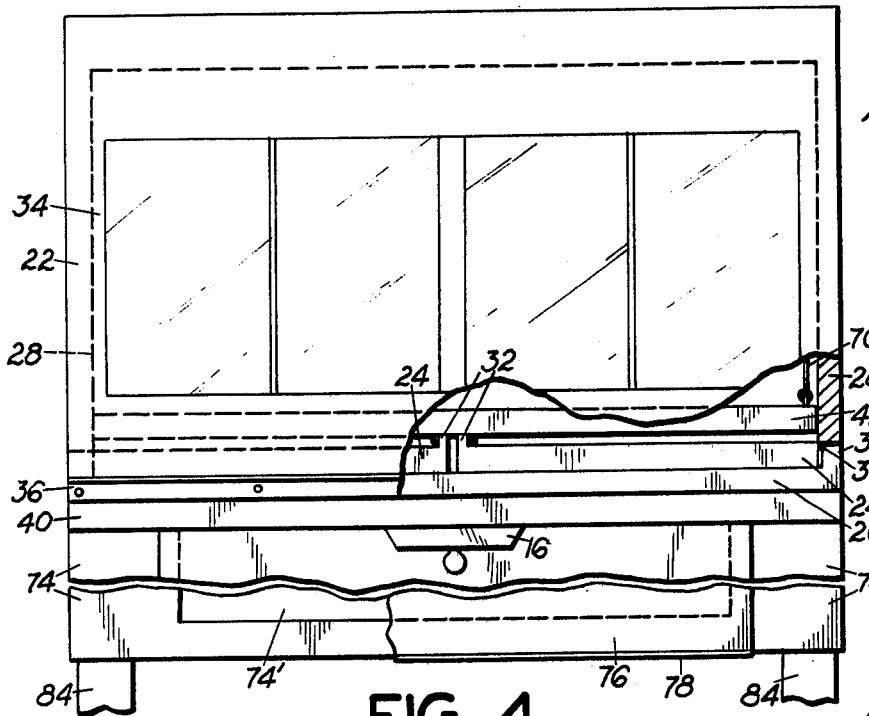
FIG. 4 is a foreshortened view in front elevation of the trailer in its travel configuration, partially broken away to disclose details of internal construction.
Figure 9:
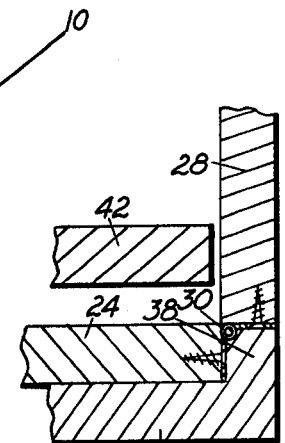
FIG. 9 is a fragmentary sectional view taken along the line 9—9 in FIG. 2.
Figure 5:
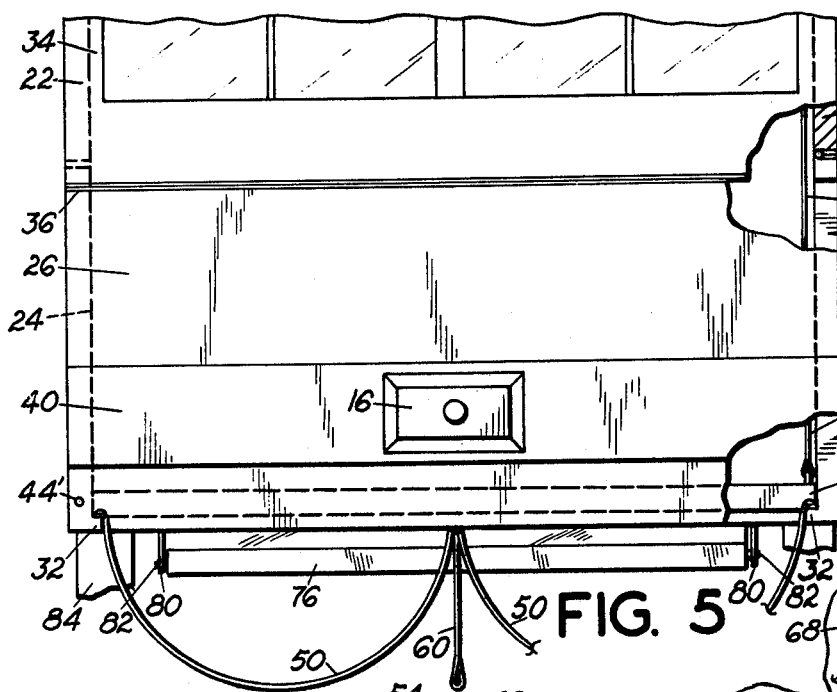
FIG. 5 is a fragmentary view in front elevation of the trailer in its living configuration, partially broken away to disclose portions of internal construction.

The side walls 24 are foldable between vertical living positions, FIGS. 3 and 5, and horizontal travel positions, FIGS. 2 and 4. Thus they are attached to the respective fixed sides 28 of the forward section of the trailer by hinges 30. Preferably the hinges extend continuously along the entire length of the side walls for a strong, rigid joint. The hinges are arranged so that the foldable side walls 24 and fixed sides 28 are coplanar when the side walls are in their unfolded, living positions. Preferably the side walls are of unitary construction and have short, inwardly facing lips 32 at their lower edges.

The front wall 26, which substantially is the same height as the side walls, also is foldable between a vertical, living position, FIGS. 3 and 5, and a horizontal, travel position, FIGS. 2 and 4. It is mounted to the fixed front wall 34 of the trailer by means of a hinge 36 which extends continuously over the full width of the front wall. The fixed front 34 of the trailer extends lower than the fixed sides 28 locating the axis of hinge 36 below the axis of hinge 30. Thus the side walls 24 fold to a position immediately above the folded position of the front wall 26.

Inwardly facing integral side extensions 38 are located on each side of the front wall, giving it added strength and rigidity. Also, when in the travel position the side extensions nest against the side walls 28, transferring side load from the hitch directly through them to the trailer rather than through hinge 36. An elongated stiffener 40, which is attached integrally to the face of the front wall, mounts the male element 16 of the trailer hitch.

A floor 42 located in the forward section of the trailer is movable vertically between a raised, travel position and a lowered, living position. When in the travel position the floor is located upwardly of the side walls 24. When it is in its living position it is located adjacent to the lower margins of the side walls where it is supported by lips 32. A threaded opening in the floor receives a bolt 44 which passes through an opening 44' (FIG. 5) in the front wall for securing the front wall and thus the side walls in their travel positions.

In the embodiment illustrated the floor is hollow for mounting means for raising and lowering the side walls 24 and front wall 26.

Figure 8:
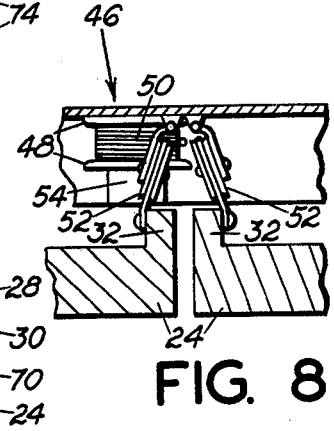
FIG. 8 is a fragmentary sectional view taken along the line 8—8 in FIG. 7.
Figures 6, 7:
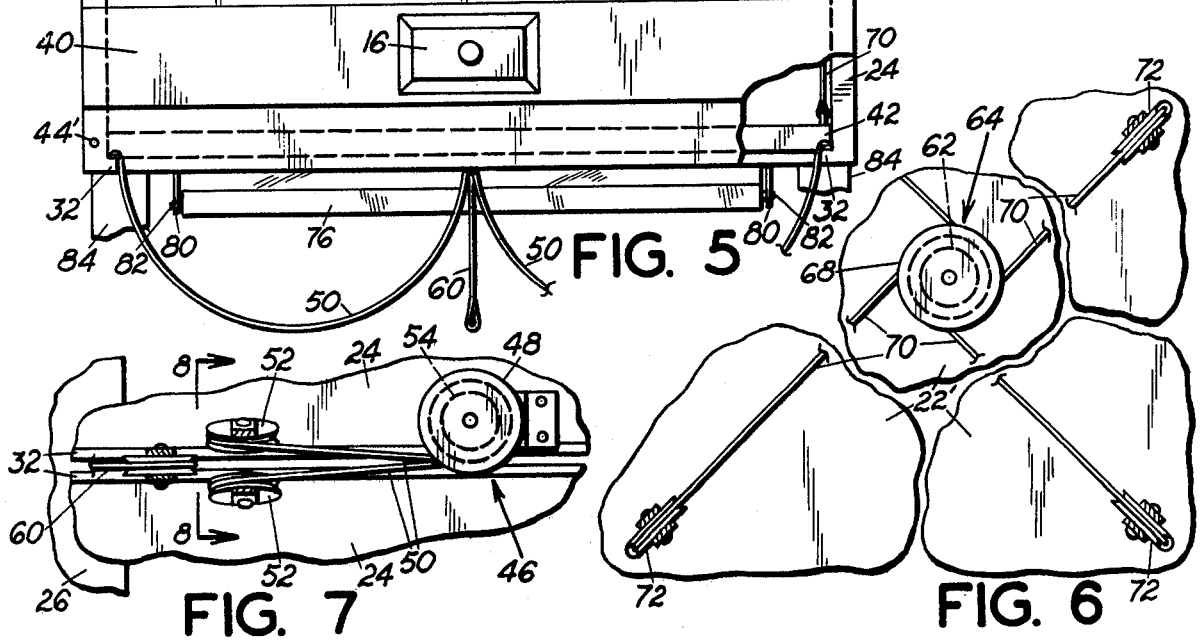
FIG. 6 is a fragmentary sectional view taken along the line 6—6 in FIG. 2.
FIG. 7 is a fragmentary sectional view taken along the line 7—7 in FIG. 2.

A side wall winch 46, FIGS. 2, 7 and 8, which is mounted in floor 42, has a drum 48 upon which side wall cables 50 are wrapped. One cable is provided for each side wall and each passes over a pulley 52, which is mounted pivotally to the floor, thence downwardly to connection with the bottom lip 32 of its associated side wall 24. A reversible electric motor 54 operates the winch upon command from a control switch (not shown) located in the trailer.

A front wall winch 56, constructed similarly to winch 46 and having a drum 58, is located in the floor forwardly of winch 46. A front wall cable 60, which is wound around the drum, extends from the drum rearwardly to a point where it is trained over a pulley 62. Thence it passes downwardly to connection with the lower edge of the front wall 26. A switch (not shown) located in the trailer activates a reversible electric motor 62 for operation of the front wall winch.

The floor is raised and lowered by a floor winch 64 mounted in the ceiling and powered by an integral reversible electric motor 66 upon activation of a control switch (not shown) located in the trailer. The floor winch includes a drum 68 upon which four cables 70 are wound. The cables extend diagonally in the ceiling to points located vertically above the corners of floor 42 where they are trained through pulleys 72 and thence pass downwardly to connection with the corners of the floor.

The passageway 74', FIG. 4, in the front wall 74 of the rearward section 20 below the forward section 22 of the trailer is covered by a door 76 when the trailer is in its travel configuration, FIG. 2. The door is joined pivotally to the lower front edge of the rear section by means of hinge 78. It folds between a raised travel position, FIG. 2, enclosing the passageway and a lowered living position, FIG. 3, below the floor. When in the travel position, the door is secured by latching means (not shown) operable from inside the trailer. When in the living position, it is held by a pair of hooks 80 which are joined to the floor. A pin 82 protruding from each side of the door is engaged by an associated hook 80.

When the trailer is uncoupled from the truck, its forward section is supported by blocks 84 which are positioned under each forward corner of the rear section 20 of the trailer.

In the operation of the trailer of the present invention, the support blocks 84 are placed in position and the truck is uncoupled and driven out from under the trailer 10. The forward section then can be expanded to its full height, living room position. First, door 76 is released and lowered to open passageway 74. Bolt 44 is removed to release front wall 26, and the front wall winch 56 is operated to unwind cable 60 from drum 58 until the front wall is lowered to its fully vertical position.

After the front wall is in position the side walls 24 are lowered by operating winch 46 to unwind cables 50 from drum 48. Then the floor 42 is lowered by unwinding cables 70 from winch 68. It will be noted that the particular arrangement of cables 70 over pulleys 72 to each corner of the floor causes it to remain level while being lowered. The floor is lowered until it rests on lips 32 of the side walls. Thus the side walls support the floor, giving a steady support. As the floor is lowered, so are winches 46 and 56. Thus cables 50 and 60 are slackened and drop below the trailer as shown in FIGS. 3 and 5. Finally, door 76 is moved to a nearly horizontal position where it is latched by placing hooks 80 over pins 82. The trailer now provides a full height living area throughout its length, with the living room area located at the front end of the trailer and communicating with the rearward section through the wide passageway 74.

When the trailer is ready to be transported again, the forward section is folded in the reverse sequence of unfolding. First, door 76 is released and the floor 42 is raised. Then the side walls 24 are raised and front wall 26 is raised. Bolt 44 is inserted into the front wall to secure it in place. Door 76 then is raised and latched.

It will be noted that, when in folded position, the various folding elements do not enter the upper portion of the trailer. Thus the trailer walls can be made of normal thickness and strength and no interior room is lost. In addition, curtains and pictures can remain on the walls at all times.

It will be apparent to those skilled in the art that various changes may be made in the size, shape and arrangement of parts described hereinbefore without departing from the spirit of this invention.

Having now described my invention and the manner in which it may be used, I claim:

1. A travel trailer comprising;
   (a) a body having a full height rear section and a vertically foreshortened forward section which is configured for extending over a towing vehicle for fifth wheel connection therewith,
   (b) folding side walls and a front wall configured for extending the foreshortened forward section downward, providing full height throughout,
   (c) hinges mounting said side walls and front wall to the forward section, allowing folding movement about horizontal axes between vertical living positions and horizontal travel positions, and
   (d) a vertically movable floor located in the forward section of the trailer, and lifting means arranged for moving the floor between a raised travel position above the folding side walls and front wall, when in their travel positions, and a lowered living position adjacent to the lower margins of the side walls and front wall when in their living positions.

2. The trailer of claim 1 wherein the folding side walls have inwardly facing lips along their lower margins for supporting the floor.

3. The trailer of claim 1 wherein a fifth wheel mounting element is mounted on the folding front wall.

4. The trailer of claim 1 wherein the folding front wall has inwardly facing side extensions and the front wall folds along a horizontal axis below the axes on which the side walls fold so that when in their travel positions the side walls are located immediately upwardly adjacent to the front wall and are nested between the side extensions thereof.

5. The trailer of claim 1 wherein powered winches and cables are used for moving the side walls and the front wall between said travel and living positions.

6. The trailer of claim 1 wherein the lifting means comprises powered winch and cable means mounted on the forward section of the trailer body and engaging the floor for moving the latter vertically.

7. The trailer of claim 1 including powered winch and cable means mounted on the floor and engaging the folding side and front walls for moving the latter between said vertical and horizontal positions.

8. The trailer of claim 1 wherein the trailer body has a wall closing the forward end of the rearward section below the forward section, an opening in said wall communicates the rearward section with the forward section when the folding walls and floor are in said living position, and a door is mounted on the body for closing said opening when the folding walls and floor are in said travel position.

* * * * *